US012606713B2

(12) United States Patent
Wu et al.

(10) Patent No.: US 12,606,713 B2
(45) **Date of Patent: *Apr. 21, 2026**

(54) ELECTROPHORETIC MEDIA INCLUDING CHARGE CONTROL AGENTS COMPRISING QUARTERNARY AMINES AND UNSATURATED POLYMERIC TAILS

(71) Applicant: E INK CORPORATION, Billerica, MA (US)

(72) Inventors: Ziyan Wu, Wayland, MA (US); Jason D. Feick, Auburndale, MA (US); James H. Aborn, Medford, MA (US); John Lock, Wakefield, MA (US); Kosta Ladavac, Cambridge, MA (US); Erik Dunkerley, Billerica, MA (US); Hui Du, Billerica, MA (US); Olga Vladimirovna Barykina-Tassa, Burlingame, CA (US)

(73) Assignee: E Ink Corporation, Billerica, MA (US)

( * ) Notice: Subject to any disclaimer, the term of this patent is extended or adjusted under 35 U.S.C. 154(b) by 113 days.

This patent is subject to a terminal disclaimer.

(21) Appl. No.: 18/792,794

(22) Filed: Aug. 2, 2024

(65) Prior Publication Data

US 2024/0392144 A1     Nov. 28, 2024

Related U.S. Application Data

(63) Continuation of application No. 17/381,983, filed on Jul. 21, 2021, now Pat. No. 12,084,595, which is a
(Continued)

(51) Int. Cl.
| | |
|---|---|
| *C09D 5/44* | (2006.01) |
| *G02F 1/1675* | (2019.01) |
| *G02F 1/1681* | (2019.01) |

(52) U.S. Cl.
CPC ............. *C09D 5/4407* (2013.01); *C09D 5/44* (2013.01); *C09D 5/4411* (2013.01);
(Continued)

(58) Field of Classification Search
CPC ........ C09D 5/44; C09D 5/448; C09D 5/4407; C09D 5/4411; C09D 5/4476; G02F 1/1681; G02F 2001/1678
See application file for complete search history.

(56) References Cited

U.S. PATENT DOCUMENTS

| | | |
|---|---|---|
| 2,800,457 A | 7/1957 | Barrett et al. |
| 4,001,140 A | 1/1977 | Foris et al. |
| | (Continued) | |

FOREIGN PATENT DOCUMENTS

| | | | | |
|---|---|---|---|---|
| JP | 2008145879 A | * | 6/2008 | ............. G02F 1/167 |

OTHER PUBLICATIONS

Kitamura, T. et al., "Electrical toner movement for electronic paper-like display", Asia Display/IDW '01, pp. 1517-1520, Paper HCS1-1 (2001). 2001.
(Continued)

*Primary Examiner* — Bijan Ahvazi
(74) *Attorney, Agent, or Firm* — Loannis Constantinides

(57) ABSTRACT

Improved formulations of electrophoretic media that can be incorporated into displays, front plane laminates, inverted front plane laminates, or color changing films. The formulations include a non-polar fluid, a plurality of first charged particles, and charge control agents (CCA) including a quaternary amine and an unsaturated polymeric tail comprising monomers of at least 10 carbon atoms in length. The formulations show improved switching speeds, as well as a larger dynamic range at low temperatures (i.e., below about 0° C.), where compared to state-of-the-art electrophoretic media.

13 Claims, 4 Drawing Sheets

Related U.S. Application Data continuation of application No. 15/284,887, filed on Oct. 4, 2016, now Pat. No. 11,098,206.

(60) Provisional application No. 62/237,691, filed on Oct. 6, 2015.

(52) U.S. Cl.
CPC ........... *C09D 5/4476* (2013.01); *C09D 5/448* (2013.01); *G02F 2001/1678* (2013.01); *G02F 1/1681* (2019.01)

(56) References Cited

U.S. PATENT DOCUMENTS

| | | | |
|---|---|---|---|
| 4,219,614 A | 8/1980 | Stahly | |
| 4,273,672 A | 6/1981 | Vassiliades | |
| 4,684,596 A | 8/1987 | Bonser et al. | |
| 5,380,362 A | 1/1995 | Schubert | |
| 5,502,118 A | 3/1996 | Macholdt et al. | |
| 5,930,026 A | 7/1999 | Jacobson | |
| 6,017,584 A | 1/2000 | Albert et al. | |
| 6,113,810 A * | 9/2000 | Hou | G03G 9/122 |
| | | | 359/296 |
| 6,241,921 B1 | 6/2001 | Jacobson et al. | |
| 6,445,489 B1 | 9/2002 | Jacobson et al. | |
| 6,504,524 B1 | 1/2003 | Gates et al. | |
| 6,512,354 B2 | 1/2003 | Jacobson et al. | |
| 6,531,997 B1 | 3/2003 | Gates et al. | |
| 6,574,034 B1 | 6/2003 | Lin et al. | |
| 6,664,944 B1 | 12/2003 | Albert et al. | |
| 6,672,921 B1 | 1/2004 | Liang et al. | |
| 6,727,873 B2 | 4/2004 | Gordon, II et al. | |
| 6,753,999 B2 | 6/2004 | Zehner et al. | |
| 6,788,449 B2 | 9/2004 | Liang et al. | |
| 6,822,782 B2 | 11/2004 | Honeyman et al. | |
| 6,825,970 B2 | 11/2004 | Goenaga et al. | |
| 6,839,158 B2 | 1/2005 | Albert et al. | |
| 6,866,760 B2 | 3/2005 | Paolini, Jr. et al. | |
| 6,900,851 B2 | 5/2005 | Morrison et al. | |
| 6,905,807 B2 | 6/2005 | Morrison et al. | |
| 6,922,276 B2 | 7/2005 | Zhang et al. | |
| 6,930,818 B1 | 8/2005 | Liang et al. | |
| 6,950,220 B2 | 9/2005 | Abramson et al. | |
| 6,982,178 B2 | 1/2006 | LeCain et al. | |
| 7,002,728 B2 | 2/2006 | Pullen et al. | |
| 7,012,600 B2 | 3/2006 | Zehner et al. | |
| 7,023,420 B2 | 4/2006 | Comiskey et al. | |
| 7,034,783 B2 | 4/2006 | Gates et al. | |
| 7,075,502 B1 | 7/2006 | Drzaic et al. | |
| 7,116,318 B2 | 10/2006 | Amundson et al. | |
| 7,116,466 B2 | 10/2006 | Whitesides et al. | |
| 7,119,772 B2 | 10/2006 | Amundson et al. | |
| 7,167,155 B1 | 1/2007 | Albert et al. | |
| 7,170,670 B2 | 1/2007 | Webber | |
| 7,193,625 B2 | 3/2007 | Danner et al. | |
| 7,202,847 B2 | 4/2007 | Gates | |
| 7,236,291 B2 | 6/2007 | Kaga et al. | |
| 7,259,744 B2 | 8/2007 | Arango et al. | |
| 7,312,784 B2 | 12/2007 | Baucom et al. | |
| 7,321,459 B2 | 1/2008 | Masuda et al. | |
| 7,327,511 B2 | 2/2008 | Whitesides et al. | |
| 7,339,715 B2 | 3/2008 | Webber et al. | |
| 7,411,719 B2 | 8/2008 | Paolini, Jr. et al. | |
| 7,420,549 B2 | 9/2008 | Jacobson et al. | |
| 7,453,445 B2 | 11/2008 | Amundson | |
| 7,492,339 B2 | 2/2009 | Amundson | |
| 7,492,505 B2 | 2/2009 | Liang et al. | |
| 7,499,211 B2 | 3/2009 | Suwabe et al. | |
| 7,528,822 B2 | 5/2009 | Amundson et al. | |
| 7,535,624 B2 | 5/2009 | Amundson et al. | |
| 7,561,324 B2 | 7/2009 | Duthaler et al. | |
| 7,583,251 B2 | 9/2009 | Arango et al. | |
| 7,602,374 B2 | 10/2009 | Zehner et al. | |
| 7,612,760 B2 | 11/2009 | Kawai | |

| | | | |
|---|---|---|---|
| 7,679,599 B2 | 3/2010 | Kawai | |
| 7,679,814 B2 | 3/2010 | Paolini, Jr. et al. | |
| 7,839,564 B2 | 11/2010 | Whitesides et al. | |
| 7,848,009 B2 | 12/2010 | Machida et al. | |
| 7,885,457 B2 | 2/2011 | Hirano et al. | |
| 7,910,175 B2 | 3/2011 | Webber | |
| 7,952,557 B2 | 5/2011 | Amundson | |
| 7,952,790 B2 | 5/2011 | Honeyman et al. | |
| 7,992,990 B2 | 8/2011 | Yamashita et al. | |
| 7,999,787 B2 | 8/2011 | Amundson et al. | |
| 8,009,348 B2 | 8/2011 | Zehner et al. | |
| 8,023,176 B2 | 9/2011 | Akashi et al. | |
| 8,031,392 B2 | 10/2011 | Hiji et al. | |
| 8,040,594 B2 | 10/2011 | Paolini, Jr. et al. | |
| 8,054,526 B2 | 11/2011 | Bouchard | |
| 8,077,141 B2 | 12/2011 | Duthaler et al. | |
| 8,098,418 B2 | 1/2012 | Paolini, Jr. et al. | |
| 8,125,501 B2 | 2/2012 | Amundson et al. | |
| 8,139,050 B2 | 3/2012 | Jacobson et al. | |
| 8,174,490 B2 | 5/2012 | Whitesides et al. | |
| 8,174,491 B2 | 5/2012 | Machida et al. | |
| 8,199,395 B2 | 6/2012 | Whitesides et al. | |
| 8,289,250 B2 | 10/2012 | Zehner et al. | |
| 8,300,006 B2 | 10/2012 | Zhou et al. | |
| 8,314,784 B2 | 11/2012 | Ohkami et al. | |
| 8,319,759 B2 | 11/2012 | Jacobson et al. | |
| 8,349,934 B2 | 1/2013 | Murofushi et al. | |
| 8,363,299 B2 | 1/2013 | Paolini, Jr. et al. | |
| 8,363,306 B2 | 1/2013 | Du et al. | |
| 8,384,658 B2 | 2/2013 | Albert et al. | |
| 8,398,199 B2 * | 3/2013 | Verdonck | B41J 2/2107 |
| | | | 347/17 |
| 8,449,096 B2 | 5/2013 | Birau et al. | |
| 8,493,648 B2 | 7/2013 | Kim et al. | |
| 8,496,324 B2 | 7/2013 | Anthony et al. | |
| 8,542,431 B2 | 9/2013 | Shuto et al. | |
| 8,558,783 B2 | 10/2013 | Wilcox et al. | |
| 8,576,470 B2 | 11/2013 | Paolini, Jr. et al. | |
| 8,576,476 B2 | 11/2013 | Telfer et al. | |
| 8,587,859 B2 | 11/2013 | Kayashima et al. | |
| 8,652,245 B2 | 2/2014 | Liu et al. | |
| 8,704,754 B2 | 4/2014 | Machida et al. | |
| 8,717,664 B2 | 5/2014 | Wang et al. | |
| 8,730,216 B2 | 5/2014 | Mizutani et al. | |
| 8,791,174 B2 | 7/2014 | Chun et al. | |
| 8,797,634 B2 | 8/2014 | Paolini, Jr. et al. | |
| 8,873,129 B2 | 10/2014 | Paolini, Jr. et al. | |
| 8,902,153 B2 | 12/2014 | Bouchard et al. | |
| 8,917,439 B2 | 12/2014 | Wang et al. | |
| 8,928,562 B2 | 1/2015 | Gates et al. | |
| 8,964,282 B2 | 2/2015 | Wang et al. | |
| 9,005,494 B2 | 4/2015 | Valianatos et al. | |
| 9,116,412 B2 | 8/2015 | Lin | |
| 9,152,005 B2 | 10/2015 | Morikawa et al. | |
| 9,199,441 B2 | 12/2015 | Danner | |
| 9,230,492 B2 | 1/2016 | Harrington et al. | |
| 9,348,193 B2 | 5/2016 | Hiji et al. | |
| 9,382,427 B2 | 7/2016 | Du et al. | |
| 9,429,810 B2 | 8/2016 | Kaino et al. | |
| 9,657,114 B2 | 5/2017 | Chun et al. | |
| 9,672,766 B2 | 6/2017 | Sjodin | |
| 9,697,778 B2 | 7/2017 | Telfer et al. | |
| 9,922,603 B2 | 3/2018 | Lin | |
| 10,031,394 B2 | 7/2018 | Nakayama et al. | |
| 10,048,562 B2 | 8/2018 | Smith | |
| 10,319,313 B2 | 6/2019 | Harris et al. | |
| 10,372,008 B2 | 8/2019 | Telfer et al. | |
| 10,672,350 B2 | 6/2020 | Amundson et al. | |
| 11,098,206 B2 * | 8/2021 | Wu | C09D 5/4476 |
| 2001/0039879 A1 * | 11/2001 | Chapman | B01D 39/083 |
| | | | 96/69 |
| 2003/0102858 A1 | 6/2003 | Jacobson et al. | |
| 2005/0253777 A1 | 11/2005 | Zehner et al. | |
| 2007/0103427 A1 | 5/2007 | Zhou et al. | |
| 2008/0024429 A1 | 1/2008 | Zehner | |
| 2008/0024482 A1 | 1/2008 | Gates et al. | |
| 2008/0043318 A1 | 2/2008 | Whitesides et al. | |
| 2008/0136774 A1 | 6/2008 | Harris et al. | |
| 2009/0225398 A1 | 9/2009 | Duthaler et al. | |

(56) References Cited

U.S. PATENT DOCUMENTS

| | | | |
|---|---|---|---|
| 2010/0060628 A1 | 3/2010 | Lenssen et al. | |
| 2010/0156780 A1 | 6/2010 | Jacobson et al. | |
| 2010/0265561 A1 | 10/2010 | Gates et al. | |
| 2011/0122480 A1* | 5/2011 | Kim | C09D 11/033 |
| | | | 252/573 |
| 2011/0175939 A1 | 7/2011 | Moriyama et al. | |
| 2011/0242641 A1* | 10/2011 | Du | G03G 17/04 |
| | | | 252/500 |
| 2012/0118198 A1 | 5/2012 | Zhou et al. | |
| 2012/0313049 A1* | 12/2012 | Du | C09B 67/0013 |
| | | | 526/194 |
| 2013/0222884 A1 | 8/2013 | Moriyama et al. | |
| 2013/0222886 A1 | 8/2013 | Kawahara et al. | |
| 2013/0222888 A1 | 8/2013 | Urano et al. | |
| 2014/0340430 A1* | 11/2014 | Telfer | G02F 1/1685 |
| | | | 345/107 |
| 2016/0275874 A1* | 9/2016 | Lin | G09G 3/2011 |

OTHER PUBLICATIONS

Yamaguchi, Y. et al., "Toner display using insulative particles charged triboelectrically", Asia Display/IDW '01, pp. 1729-1730, Paper AMD4-4 (2001). 2001.

Heikenfeld, J. et al., "A critical review of the present and future prospects for electronic paper", SID, 19(2), pp. 129-156 (2011). 2011.

Gutcho, M.H., Microcapsules and Microencapsulation Techniques, Noyes Data Corp., Park Ridge NJ, (1976) Dec. 31, 1976.

Vandegaer, J.E. (ed.), "Microencapsulation Processes and Applications", pp. v-x, 1-180 (Plenum Press, New York 1974) Dec. 31, 1974.

Korean Intellectual Property Office; PCT/US2016/055294; International Search Report and Written Opinion; Jan. 6, 2017. Jan. 6, 2017.

European Patent Office, EP Appl. No 16854159.7, Extended European Search Report, Jul. 1, 2019. Jul. 1, 2019.

* cited by examiner

ELECTROPHORETIC MEDIA INCLUDING CHARGE CONTROL AGENTS COMPRISING QUARTENARY AMINES AND UNSATURATED POLYMERIC TAILS

CROSS-REFERENCE TO RELATED APPLICATIONS

This application is a continuation of U.S. application having Ser. No. 17/381,983 filed on Jul. 21, 2021 (Publication No. 2021/035332 A1), which is a continuation of U.S. application having Ser. No. 15/284,887 filed on Oct. 4, 2016 (Publication No. 2017/0097556 A1, now U.S. Pat. No. 11,098,206 B2, issued on Aug. 24, 2021), which claims priority to U.S. Provisional Application No. 62/237,691, filed Oct. 6, 2015, the contents of which are incorporated herein by reference in their entireties.

BACKGROUND OF THE INVENTION

Particle-based electrophoretic displays have been the subject of intense research and development for a number of years. In such displays, a plurality of charged particles (sometimes referred to as pigment particles) move through a fluid under the influence of an electric field. The electric field is typically provided by a conductive film or a transistor, such as a field-effect transistor. Electrophoretic displays have good brightness and contrast, wide viewing angles, state bistability, and low power consumption when compared with liquid crystal displays. Such electrophoretic displays have slower switching speeds than LCD displays, however, and electrophoretic displays are typically too slow to display real-time video. Additionally, the electrophoretic displays can be sluggish at low temperatures because the viscosity of the fluid limits the movement of the electrophoretic particles. Despite these shortcomings, electrophoretic displays can be found in everyday products such as electronic books (e-readers), mobile phones and mobile phone covers, smart cards, signs, watches, shelf labels, and flash drives.

Many commercial electrophoretic media essentially display only two colors, with a gradient between the black and white extremes, known as "grayscale." Such electrophoretic media either use a single type of electrophoretic particle having a first color in a colored fluid having a second, different color (in which case, the first color is displayed when the particles lie adjacent the viewing surface of the display and the second color is displayed when the particles are spaced from the viewing surface), or first and second types of electrophoretic particles having differing first and second colors in an uncolored fluid. In the latter case, the first color is displayed when the first type of particles lie adjacent the viewing surface of the display and the second color is displayed when the second type of particles lie adjacent the viewing surface). Typically the two colors are black and white.

If a full color display is desired, a color filter array may be deposited over the viewing surface of the monochrome (black and white) display. Displays with color filter arrays rely on area sharing and color blending to create color stimuli. The available display area is shared between three or four primary colors such as red/green/blue (RGB) or red/green/blue/white (RGBW), and the filters can be arranged in one-dimensional (stripe) or two-dimensional (2×2) repeat patterns. Other choices of primary colors or more than three primaries are also known in the art. The three (in the case of RGB displays) or four (in the case of RGBW displays)

sub-pixels are chosen small enough so that at the intended viewing distance they visually blend together to a single pixel with a uniform color stimulus ('color blending'). The inherent disadvantage of area sharing is that the colorants are always present, and colors can only be modulated by switching the corresponding pixels of the underlying monochrome display to white or black (switching the corresponding primary colors on or off). For example, in an ideal RGBW display, each of the red, green, blue and white primaries occupy one fourth of the display area (one sub-pixel out of four), with the white sub-pixel being as bright as the underlying monochrome display white, and each of the colored sub-pixels being no lighter than one third of the monochrome display white. The brightness of the white color shown by the display as a whole cannot be more than one half of the brightness of the white sub-pixel (white areas of the display are produced by displaying the one white sub-pixel out of each four, plus each colored sub-pixel in its colored form being equivalent to one third of a white sub-pixel, so the three colored sub-pixels combined contribute no more than the one white sub-pixel). The brightness and saturation of colors is lowered by area-sharing with color pixels switched to black. Area sharing is especially problematic when mixing yellow because it is lighter than any other color of equal brightness, and saturated yellow is almost as bright as white. Switching the blue pixels (one fourth of the display area) to black makes the yellow too dark.

Although seemingly simple, electrophoretic media and electrophoretic devices display complex behaviors. For instance, it has been discovered that simple "on/off" voltage pulses are insufficient to achieve high-quality text in electronic readers. Rather, complicated "waveforms" are needed to drive the particles between states and to assure that the new displayed text does not retain a memory of the previous text, i.e., a "ghost." See, for example, U.S. patent application Ser. No. 20150213765. Compounded with the complexities of the electric fields, the internal phase, i.e., the mixture of particles (pigment) and fluid, can exhibit unexpected behavior due to interactions between charged species and the surrounding environment (such as an encapsulation medium) upon the application of an electric field. Additionally, unexpected behaviors may result from impurities in the fluid, pigments, or encapsulation medium. Accordingly, it is difficult to predict how an electrophoretic display will respond to variations in the internal phase composition.

The inventors acknowledge a large body of patents and applications assigned to, or in the names of, the Massachusetts Institute of Technology (MIT) and E Ink Corporation that describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Films and sub-assemblies containing electro-optic materials; see for example U.S. Pat. Nos. 6,982,178 and 7,839,564;

(d) Backplanes, adhesive layers and other auxiliary layers and methods used in displays; see for example U.S. Pat. Nos. 7,116,318 and 7,535,624;

(e) Color formation and color adjustment; see for example U.S. Pat. Nos. 6,017,584; 6,664,944; 6,864,875; 7,075, 502; 7,167,155; 7,667,684; 7,791,789; 7,839,564; 7,956,841; 8,040,594; 8,054,526; 8,098,418; 8,213, 076; and 8,363,299; and U.S. Patent Applications Publication Nos. 2004/0263947; 2007/0223079; 2008/0023332; 2008/0043318; 2008/0048970; 2009/0004442; 2009/0225398; 2010/0103502; 2010/0156780; 2011/0164307; 2011/0195629; 2011/0310461; 2012/0008188; 2012/0019898; 2012/0075687; 2012/0081779; 2012/0134009; 2012/0182597; 2012/0212462; 2012/0157269; and 2012/0326957;

(f) Methods for driving displays; see for example U.S. Pat. Nos. 5,930,026; 6,445,489; 6,504,524; 6,512,354; 6,531,997; 6,753,999; 6,825,970; 6,900,851; 6,995, 550; 7,012,600; 7,023,420; 7,034,783; 7,116,466; 7,119,772; 7,193,625; 7,202,847; 7,259,744; 7,304, 787; 7,312,794; 7,327,511; 7,453,445; 7,492,339; 7,528,822; 7,545,358; 7,583,251; 7,602,374; 7,612, 760; 7,679,599; 7,688,297; 7,729,039; 7,733,311; 7,733,335; 7,787,169; 7,952,557; 7,956,841; 7,999, 787; 8,077,141; 8,125,501; 8,139,050; 8,174,490; 8,289,250; 8,300,006; 8,305,341; 8,314,784; 8,384, 658; 8,558,783; and 8,558,785; and U.S. Patent Applications Publication Nos. 2003/0102858; 2005/0122284; 2005/0253777; 2007/0091418; 2007/0103427; 2008/0024429; 2008/0024482; 2008/0136774; 2008/0291129; 2009/0174651; 2009/0179923; 2009/0195568; 2009/0322721; 2010/0220121; 2010/0265561; 2011/0193840; 2011/0193841; 2011/0199671; 2011/0285754; and 2013/0194250 (these patents and applications may hereinafter be referred to as the MEDEOD (MEthods for Driving Electro-optic Displays) applications);

(g) Applications of displays; see for example U.S. Pat. Nos. 7,312,784 and 8,009,348; and (h) Non-electrophoretic displays, as described in U.S. Pat. Nos. 6,241,921; 6,950,220; 7,420,549 and 8,319,759; and U.S. Patent Application Publication No. 2012/0293858.

All of the above patents and patent applications are incorporated herein by reference in their entireties.

SUMMARY OF THE INVENTION

The invention is an improved formulation for an electrophoretic medium that allows for faster switching speeds and a larger dynamic range when used in electrophoretic displays. The improved electrophoretic medium includes a non-polar fluid, a plurality of first charged particles, and charge control agents that include a quaternary amine and an unsaturated polymeric tail comprising monomers of at least 10 carbon atoms in length. The charge control agents may form complexes with the first charged particles. Typically the electrophoretic medium will include at least a second charged particle, however, electrophoretic media of the invention may include many different types of charge particles, each of which may have different charge and mobility properties from the other particles. The additional charged particles may also be complexed with the charge control agents, e.g., including a quaternary amine and an unsaturated polymeric tail comprising monomers of at least 10 carbon atoms in length, however other charge control agents can be used in addition. In many embodiments, the ratio of charge control agent to first charged particles is greater than 1:1000 (wt/wt), e.g., greater than 1:500 (wt/wt), e.g., greater than 1:300 (wt/wt), e.g., greater than 1:200 (wt/wt), e.g., greater than 1:100 (wt/wt).

The charge control agents, including a quaternary amine and an unsaturated polymeric tail comprising monomers of at least 10 carbon atoms in length, may include multiple double bonds. For example, the polymeric tail may be the condensation product of an unsaturated carboxylic acid monomer having a secondary alcohol. The resulting polymer will include a backbone of repeating alkene units as well as pendant alkyl chains (i.e., a comb polymer). Other polymeric tails, derived from other unsaturated monomers, are also suitable for use with the invention. In some embodiments, the polymer tail may be the condensation product of an unsaturated carboxylic acid monomer having a primary alcohol. In some embodiments, the polymer tail may be the condensation product of an unsaturated carboxylic acid monomer having a tertiary alcohol.

Electrophoretic media of the invention are typically encapsulated when used in a display to improve the switching speed and to discourage gravitational settling. The electrophoretic media may be encapsulated in microcells or a protein coacervate, such as a coacervate comprise gelatin. In other embodiments, the electrophoretic media are dispersed, as a suspension, in a polymer. When incorporated into a display, the encapsulated medium may have a dynamic range of 55L* at 0° C. when driven by a 15V, 500 ms drive pulse.

BRIEF DESCRIPTION OF DRAWINGS

As shown in FIG. 3, the dynamic range and switching speed of formulations including unsaturated charge control agents is much improved at lower operating temperatures (~0° C.).

DETAILED DESCRIPTION OF THE INVENTION

Figure 1:
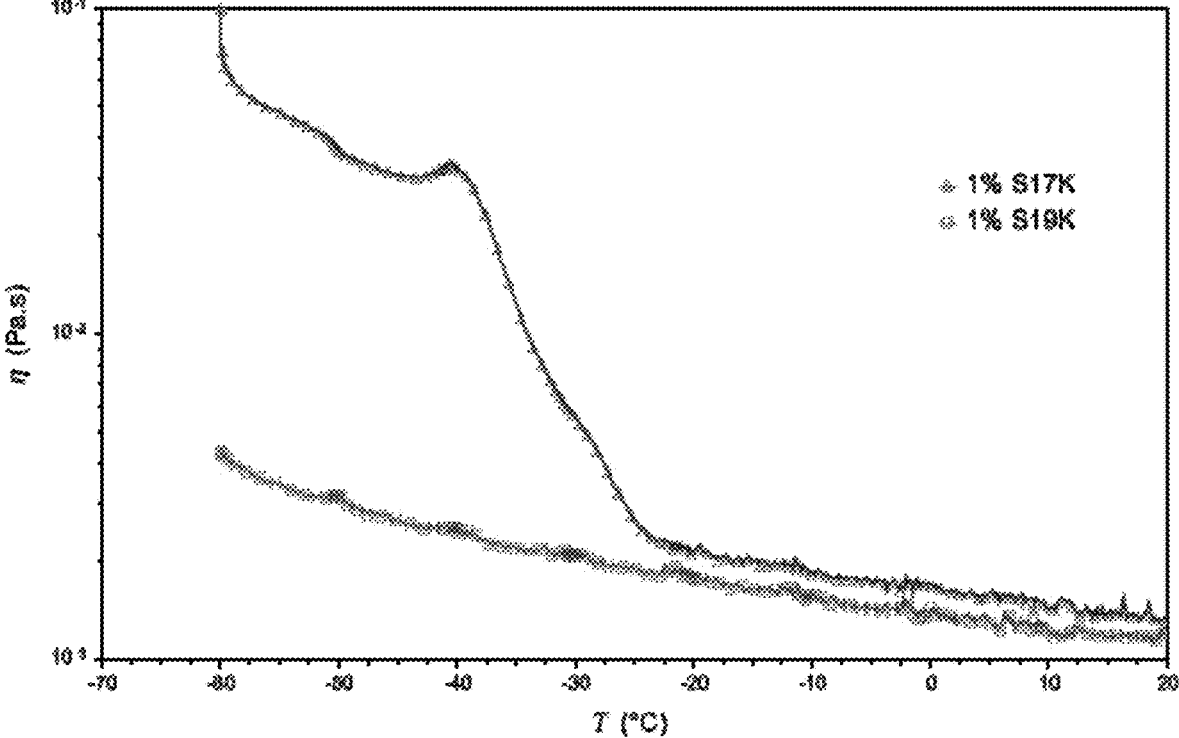
FIG. 1 shows the difference in viscosity between two electrophoretic media having identical non-polar fluids and pigment loading, but different charge control agents.

As indicated above, the present invention provides improved formulations of electrophoretic media. The media may be incorporated into displays, or into front plane laminates or inverted front plane laminates that are coupled to a backplane to make a display. The formulations include a non-polar fluid and a plurality of first charged particles dispersed in the non-polar fluid, wherein the first charged particles are complexed with a charge control agent including a quaternary amine and an unsaturated polymeric tail comprising monomers of at least 10 carbon atoms in length. The formulations show improved switching speed and dynamic range at low temperatures (i.e., approximately 0° C.).

The term gray state is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate gray state would actually be pale blue. Indeed, as already mentioned, the change in optical state may not be a color change at all. The terms black and white may be used hereinafter to refer to the two extreme optical states of a display, and should be understood as normally including extreme optical states which are not strictly black and white, for example the aforementioned white and dark blue states.

The terms bistable and bistability are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called multi-stable rather than bistable, although for convenience the term bistable may be used herein to cover both bistable and multi-stable displays.

The term impulse, when used to refer to driving an electrophoretic display, is used herein to refer to the integral of the applied voltage with respect to time during the period in which the display is driven.

A particle that absorbs, scatters, or reflects light, either in a broad band or at selected wavelengths, is referred to herein as a colored or pigment particle. Various materials other than pigments (in the strict sense of that term as meaning insoluble colored materials) that absorb or reflect light, such as dyes or photonic crystals, etc., may also be used in the electrophoretic media and displays of the present invention.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760. Accordingly, for purposes of the present application, such polymer-dispersed electrophoretic media are regarded as sub-species of encapsulated electrophoretic media.

A related type of electrophoretic display is a so-called microcell electrophoretic display. In a microcell electrophoretic display, the charged particles and the fluid are not encapsulated within microcapsules but instead are retained within a plurality of cavities formed within a carrier medium, typically a polymeric film. Sec, for example, U.S. Pat. Nos. 6,672,921 and 6,788,449, both assigned to Sipix Imaging, Inc.

As noted above, electrophoretic media require the presence of a fluid. In most prior art electrophoretic media, this fluid is a liquid, but electrophoretic media can be produced using gaseous fluids; sec, for example, Kitamura, T., et al., Electrical toner movement for electronic paper-like display, IDW Japan, 2001, Paper HCS1-1, and Yamaguchi, Y., et al., Toner display using insulative particles charged triboelectrically, IDW Japan, 2001, Paper AMD4-4). Sec also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word printing is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

The aforementioned U.S. Pat. No. 6,982,178 describes a method of assembling electrophoretic displays (including an encapsulated electrophoretic display). Essentially, this patent describes a so-called front plane laminate (FPL) which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term light-transmissive is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term light-transmissive should of course be interpreted to refer to transmission of the relevant non-visible wavelengths. The substrate will typically be a polymeric film, and will normally have a thickness in the range of about 1 to about 25 mil (25 to 634 μm), preferably about 2 to about 10 mil (51 to 254 μm). The electrically-conductive layer is conveniently a thin metal or metal oxide layer of, for example, aluminum or indium tin oxide (ITO), or may be a conductive polymer. Poly(ethylene terephthalate) (PET) films coated with aluminum or ITO are available commercially, for example as aluminized Mylar (Mylar is a Registered Trade Mark) from E.I. du Pont de Nemours & Company, Wilmington DE, and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

U.S. Pat. No. 7,561,324 describes a so-called double release sheet which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called inverted front plane laminate, which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

Multilayer, stacked electrophoretic displays are known in the art; see, for example, J. Heikenfeld, P. Drzaic, J-S Yeo and T. Koch, Journal of the SID, 19(2), 2011, pp. 129-156. In such displays, ambient light passes through images in each of the three subtractive primary colors, in precise analogy with conventional color printing. U.S. Pat. No. 6,727,873 describes a stacked electrophoretic display in which three layers of switchable cells are placed over a reflective background. Similar displays are known in which colored particles are moved laterally (see International Application No. WO 2008/065605) or, using a combination of vertical and lateral motion, sequestered into micropits. In both cases, each layer is provided with electrodes that serve to concentrate or disperse the colored particles on a pixel-by-pixel basis, so that each of the three layers requires a layer of thin-film transistors (TFT's) (two of the three layers of TFT's must be substantially transparent) and a light-transmissive counter-electrode. Such a complex arrangement of electrodes is costly to manufacture, and in the present state of the art it is difficult to provide an adequately transparent plane of pixel electrodes, especially as the white state of the display must be viewed through several layers of electrodes. Multi-layer displays also suffer from parallax problems as the thickness of the display stack approaches or exceeds the pixel size.

U.S. Applications Publication Nos. 2012/0008188 and 2012/0134009 describe multicolor electrophoretic displays having a single back plane comprising independently addressable pixel electrodes and a common, light-transmissive front electrode. Between the back plane and the front electrode is disposed a plurality of electrophoretic layers. Displays described in these applications are capable of rendering any of the primary colors (red, green, blue, cyan, magenta, yellow, white and black) at any pixel location. However, there are disadvantages to the use of multiple electrophoretic layers located between a single set of addressing electrodes. The electric field experienced by the particles in a particular layer is lower than would be the case for a single electrophoretic layer addressed with the same voltage. In addition, optical losses in an electrophoretic layer closest to the viewing surface (for example, caused by light scattering or unwanted absorption) may affect the appearance of images formed in underlying electrophoretic layers.

Attempts have been made to provide full-color electrophoretic displays using a single electrophoretic layer. For example, U.S. Patent Application Publication No. 2013/0208338 describes a color display comprising an electrophoretic fluid which comprises one or two types of pigment particles dispersed in a clear and colorless or colored solvent, the electrophoretic fluid being sandwiched between a common electrode and a plurality of driving electrodes. The driving electrodes are kept at a certain distance in order to expose a background layer. U.S. Patent Application Publication No. 2014/0177031 describes a method for driving a display cell filled with an electrophoretic fluid comprising two types of charged particles carrying opposite charge polarities and of two contrast colors. The two types of pigment particles are dispersed in a colored solvent or in a solvent with non-charged or slightly charged colored particles dispersed therein. The method comprises driving the display cell to display the color of the solvent or the color of the non-charged or slightly charged colored particles by applying a driving voltage which is about 1 to about 20% of the full driving voltage. U.S. Patent Application Publication No. 2014/0092465 and 2014/0092466 describe an electrophoretic fluid, and a method for driving an electrophoretic display. The fluid comprises first, second and third type of pigment particles, all of which are dispersed in a solvent or solvent mixture. The first and second types of pigment particles carry opposite charge polarities, and the third type of pigment particles has a charge level being less than about 50% of the charge level of the first or second type. The three types of pigment particles have different levels of threshold voltage, or different levels of mobility, or both.

U.S. Patent Application Publication No. 2007/0031031 describes an image processing device for processing image data in order to display an image on a display medium in which each pixel is capable of displaying white, black and one other color. U.S. Patent Applications Publication Nos. 2008/0151355; 2010/0188732; and 2011/0279885 describe a color display in which mobile particles move through a porous structure. U.S. Patent Applications Publication Nos.

2008/0303779 and 2010/0020384 describe a display medium comprising first, second and third particles of differing colors. The first and second particles can form aggregates, and the smaller third particles can move through apertures left between the aggregated first and second particles. U.S. Patent Application Publication No. 2011/0134506 describes a display device including an electrophoretic display element including plural types of particles enclosed between a pair of substrates, at least one of the substrates being translucent and each of the respective plural types of particles being charged with the same polarity, differing in optical properties, and differing in either in migration speed and/or electric field threshold value for moving, a translucent display-side electrode provided at the substrate side where the translucent substrate is disposed, a first back-side electrode provided at the side of the other substrate, facing the display-side electrode, and a second back-side electrode provided at the side of the other substrate, facing the display-side electrode; and a voltage control section that controls the voltages applied to the display-side electrode, the first back-side electrode, and the second back-side electrode, such that the types of particles having the fastest migration speed from the plural types of particles, or the types of particles having the lowest threshold value from the plural types of particles, are moved, in sequence by each of the different types of particles, to the first back-side electrode or to the second back-side electrode, and then the particles that moved to the first back-side electrode are moved to the display-side electrode. U.S. Patent Applications Publication Nos. 2011/0175939; 2011/0298835; 2012/0327504; and 2012/0139966 describe color displays which rely upon aggregation of multiple particles and threshold voltages. U.S. Patent Application Publication No. 2013/0222884 describes an electrophoretic particle, which contains a colored particle containing a charged group-containing polymer and a coloring agent, and a branched silicone-based polymer being attached to the colored particle and containing, as copolymerization components, a reactive monomer and at least one monomer selected from a specific group of monomers. U.S. Patent Application Publication No. 2013/0222885 describes a dispersion liquid for an electrophoretic display containing a dispersion medium, a colored electrophoretic particle group dispersed in the dispersion medium and migrates in an electric field, a non-electrophoretic particle group which does not migrate and has a color different from that of the electrophoretic particle group, and a compound having a neutral polar group and a hydrophobic group, which is contained in the dispersion medium in a ratio of about 0.01 to about 1 mass % based on the entire dispersion liquid. U.S. Patent Application Publication No. 2013/0222886 describes a dispersion liquid for a display including floating particles containing: core particles including a colorant and a hydrophilic resin; and a shell covering a surface of each of the core particles and containing a hydrophobic resin with a difference in a solubility parameter of 7.95 $(J/cm^3)^{1/2}$ or more. U.S. Patent Applications Publication Nos. 2013/0222887 and 2013/0222888 describe an electrophoretic particle having specified chemical compositions. Finally, U.S. Patent Application Publication No. 2014/0104675 describes a particle dispersion including first and second colored particles that move in response to an electric field, and a dispersion medium, the second colored particles having a larger diameter than the first colored particles and the same charging characteristic as a charging characteristic of the first color particles, and in which the ratio (Cs/Cl) of the charge amount Cs of the first colored particles to the charge amount Cl of the second colored particles per unit area of the display is less than or equal to 5. Some of the aforementioned displays do provide full color but at the cost of requiring addressing methods that are long and cumbersome.

U.S. Patent Applications Publication Nos. 2012/0314273 and 2014/0002889 describe an electrophoresis device including a plurality of first and second electrophoretic particles included in an insulating liquid, the first and second particles having different charging characteristics that are different from each other; the device further comprising a porous layer included in the insulating liquid and formed of a fibrous structure.

Charge Control Agents

It is preferred that the polymers formed on particles by the present processes include charged or chargeable groups, since such groups are useful in controlling the charge on the electrophoretic particles. The charge on electrophoretic particles is normally controlled by adding a charge control agent (CCA) to the electrophoretic medium. In many embodiments, the CCA is a surfactant which adsorbs on to the particles and varies the charge thereon. However, the invention is not limited to adsorbed CCAs, and any mixture including charged particles and a CCA that gives the desired performance is suitable. For example, the CCAs may be complexed with the charged particles, absorbed into the particles, or they may be covalently bound to the surface of the particles. The particles and the CCAs may exist in a charge complex, or be loosely associated via van der Waals forces.

Charge control agents often charge the particles by poorly understood and uncontrolled processes, and can lead to undesirably high conductivity of the electrophoretic medium. Also, since the charge control agent is only physically adsorbed on to the particles and is not bound thereto, changes in conditions may cause partial or complete desorption of the charge control agent from the particles, with consequent undesirable changes in the electrophoretic characteristics of the particles. The desorbed charge control agent might resorb on to other surfaces within the electrophoretic medium, and such resorption has the potential for causing additional problems.

The use of charge control agents is especially difficult in dual particle electrophoretic media, where a charge control agent may adsorb on to the surface of one or both types of electrophoretic particles. Indeed, the present inventors have observed cases where the addition of a charge control agent to a dual particle electrophoretic medium, which was intended to be of the type in which the two types of particles bear charges of opposite polarity, resulted in some particles of one type becoming positively charged, and other particles of the same type becoming negatively charged, thus rendering the medium essentially useless for its intended purpose. In the case of an encapsulated dual particle electrophoretic medium, it is also possible for the charge control agent to adsorb on to the capsule wall. Providing charged groups within the bound polymer ensures that these charged groups remain fixed on to the particle, with essentially no tendency to desorb (unless the polymer chains themselves are rendered capable of desorption, as already discussed).

As described previously, charge control agents comprising a quaternary amine and an unsaturated polymeric tail comprising monomers of at least 10 carbon atoms in length are preferred. Quaternary amines comprise a quaternary ammonium cation $[NR_1R_2R_3R_4]^+$ bonded to an organic molecule, for example an alkyl group or an aryl group. Quaternary amine charge control agents typically include a long non-polar tail attached to the charged ammonium cation, such as the families of fatty acid quaternary amines offered by Akzo Nobel under the tradenames ARQUAD. The quaternary amine charge control agents may be purchased in a purified form, or the charge control agents may be purchased as a reaction product that has formed a quaternary amine charge control agent. For example, SOL-SPERSE 17000 (Lubrizol Corporation), may be purchased as a reaction product of 12-hydroxy-octadecanoic acid homopolymer with N,N-dimethyl-1,3-propanediamine and methylbisulfate.

In preferred embodiments, the non-polar tail of the quaternary amine charge control agents are unsaturated, i.e., they have at least one carbon-carbon double bond. Unexpectedly, when unsaturated quaternary amine charge control agents are incorporated into electrophoretic media, the media has improved switching speeds, especially at low temperatures. In some embodiments, the non-polar tail of the quaternary amine charge control agents is formed from a polymeric or oligomeric compound, such as a polyester. In some instances, the polyester may be formed via a condensation reaction of carboxylic acid, e.g., a fatty acid, having a secondary amine. In such instances, the condensation reaction will result in repeating units having at least one carbon-carbon double bond (i.e., unsaturated), with repeating pendant carbon chains, which may be saturated or unsaturated. Such unsaturated polymeric quaternary amine charge control agents are commercially available from Lubrizol under the tradenames SOLSPERSE 19000 and SOL-SPERSE 16000. The overall length of the monomer from which the tail is formed is at least 10 carbon atoms in length, for example 14 carbon atoms in length, for example 18 carbon atoms in length. The charge control agents may be added to the electrophoretic medium at a concentration of greater than 1 g of charge control agent for every 100 g of charged particles. For example, the charge control agent to charged particle ratio may be 1:30 (wt/wt), e.g., 1:25 (wt/wt), e.g., 1:20 (wt/wt). The charge control agents may have an average molecular weight of greater than 12,000 grams/mole, e.g., greater than 13,000 grams/mole, e.g., greater than 14,000 grams/mole, e.g., greater than 15,000 grams/mole, e.g., greater than 16,000 grams/mole, e.g., greater than 17,000 grams/mole, e.g., greater than 18,000 grams/mole, e.g., greater than 19,000 grams/mole, e.g., greater than 20,000 grams/mole, e.g., greater than 21,000 grams/mole. For example, the average molecular weight of the charge control agent may be between 14,000 grams/mole and 22,000 grams/mole, e.g., between 15,000 grams/mole and 20,000 grams/mole. In some embodiments, the charge control agents have an average molecular weight of about 19,000 grams/mole.

Additional charge control agents may be used, with or without charged groups in polymer coatings, to provide good electrophoretic mobility to the electrophoretic particles. Stabilizers may be used to prevent agglomeration of the electrophoretic particles, as well as prevent the electrophoretic particles from irreversibly depositing onto the capsule wall. Either component can be constructed from materials across a wide range of molecular weights (low molecular weight, oligomeric, or polymeric), and may be a single pure compound or a mixture. An optional charge control agent or charge director may be used. These constituents typically consist of low molecular weight surfactants, polymeric agents, or blends of one or more components and serve to stabilize or otherwise modify the sign and/or magnitude of the charge on the electrophoretic particles. Additional pigment properties which may be relevant are the particle size distribution, the chemical composition, and the lightfastness.

Charge adjuvants may also be added. These materials increase the effectiveness of the charge control agents or charge directors. The charge adjuvant may be a polyhydroxy compound or an aminoalcohol compound, and is preferably soluble in the suspending fluid in an amount of at least 2% by weight. Examples of polyhydroxy compounds which contain at least two hydroxyl groups include, but are not limited to, ethylene glycol, 2,4,7,9-tetramethyldecyne-4,7-diol, poly(propylene glycol), pentaethylene glycol, tripropylene glycol, triethylene glycol, glycerol, pentaerythritol, glycerol tris(12-hydroxystearate), propylene glycerol monohydroxystearate, and ethylene glycol monohydroxystearate. Examples of aminoalcohol compounds which contain at least one alcohol function and one amine function in the same molecule include, but are not limited to, triisopropanolamine, triethanolamine, ethanolamine, 3-amino-1-propanol, o-aminophenol, 5-amino-1-pentanol, and tetrakis(2-hydroxyethyl)ethylenediamine. The charge adjuvant is preferably present in the suspending fluid in an amount of about 1 to about 100 milligrams per gram ("mg/g") of the particle mass, and more preferably about 50 to about 200 mg/g.

In addition to using the unsaturated charge control agents described above, it may be very convenient to treat the particles (after any preliminary treatment such as silica coating) with a mixture of two reagents, one of which carries the charged or chargeable group (or a group which will eventually be treated to produce the desired charged or chargeable group), and the other of which carries the polymerizable or polymerization-initiating group. Desirably, the two reagents have the same, or essentially the same, functional group which reacts with the particle surface so that, if minor variations in reaction conditions occur, the relative rates at which the reagents react with the particles will change in a similar manner, and the ratio between the number of charged or chargeable groups and the number of polymerizable or polymerization-initiating groups will remain substantially constant. It will be appreciated that this ratio can be varied and controlled by varying the relative molar amounts of the two (or more) reagents used in the mixture. Examples of reagents which provide chargeable sites but not polymerizable or polymerization-initiating groups include 3-(trimethoxysilyl)propylamine, N-[3-(trimethoxysilyl)propyl]diethylenetriamine, N-[3-(trimethoxysilyl)propyl]ethylene and 1-[3-(trimethoxysilyl)propyl]urea; all these silane reagents may be purchased from United Chemical Technologies, Inc., Bristol, Pa., 19007. As already mentioned, an example of a reagent which provides polymerizable groups but not charged or chargeable groups is 3-(trimethoxysilyl)propyl methacrylate.

The charged particle CCA complexes formed may be used with advantage in all of the types of electrophoretic display (namely single particle, opposite charge dual particle, same polarity dual particle and polymer dispersed) previously described. However, the charged particle CCA complexes of the present invention are especially useful in opposite charge dual particle electrophoretic displays, which are especially difficult to stabilize, since as already mentioned the two types of particles of opposite polarity are inherently attracted towards one another and hence have a strong tendency to form aggregates which may interfere with the electrophoretic operation of the display. The described charged particle CCA complexes may be used to construct an electrophoretic medium having only one type of particle, such as used in a variable transmission window. The described charged particle CCA complexes may be used to construct an electrophoretic medium to be used in black/white displays, i.e., including black particles and white particles. The described charged particle CCA complexes may be used to construct an electrophoretic medium to be used in colors displays, i.e., including, for example, three, four, five, six, seven, or eight different types of particles. For examples, a display may be constructed where the particles include black, white, and red or black, white, and yellow. Alternatively, the display may include red, green, and blue particles, or cyan, magenta, and yellow particles, or red, green, blue, and yellow particles.

Apart from the provision of the polymer on the pigment particles, the electrophoretic media of the present invention may employ the same components and manufacturing techniques as in the aforementioned Massachusetts Institute of Technology and E Ink Corporation patents and applications.

Non-Polar Fluids

As already indicated, the suspending fluid containing the particles should be chosen based on properties such as density, refractive index, and solubility. A preferred suspending fluid has a low dielectric constant (about 2), high volume resistivity (about 1015 ohm-cm), low viscosity (less than 5 centistokes ("cst")), low toxicity and environmental impact, low water solubility (less than 10 parts per million ("ppm")), high specific gravity (greater than 1.5), a high boiling point (greater than 90° C.), and a low refractive index (less than 1.2).

The choice of non-polar fluid may be based on concerns of chemical inertness, density matching to the electrophoretic particle, or chemical compatibility with both the electrophoretic particle and bounding capsule (in the case of encapsulated electrophoretic displays). The viscosity of the fluid should be low when movement of the particles is desired. The refractive index of the suspending fluid may also be substantially matched to that of the particles. As used herein, the refractive index of a suspending fluid "is substantially matched" to that of a particle if the difference between their respective refractive indices is between about zero and about 0.3, and is preferably between about 0.05 and about 0.2.

Non-polar organic solvents, such as halogenated organic solvents, saturated linear or branched hydrocarbons, silicone oils, and low molecular weight halogen-containing polymers are some useful non-polar fluids. The non-polar fluid may comprise a single fluid. The non-polar fluid will, however, often be a blend of more than one fluid in order to tune its chemical and physical properties. Furthermore, the non-polar fluid may contain additional surface modifiers to modify the surface energy or charge of the electrophoretic particle or bounding capsule. Reactants or solvents for the microencapsulation process (oil soluble monomers, for example) can also be contained in the suspending fluid. Additional charge control agents can also be added to the suspending fluid.

Useful organic solvents include, but are not limited to, epoxides, such as decane epoxide and dodecane epoxide; vinyl ethers, such as cyclohexyl vinyl ether and Decave (Registered Trade Mark of International Flavors & Fragrances, Inc., New York, N.Y.); and aromatic hydrocarbons, such as toluene and naphthalene. Useful halogenated organic solvents include, but are not limited to, tetrafluorodibromoethylene, tetrachloroethylene, trifluorochloroethylene, 1,2,4-trichlorobenzene and carbon tetrachloride. These materials have high densities. Useful hydrocarbons include, but are not limited to, dodecane, tetradecane, the aliphatic hydrocarbons in the Isopar (Registered Trade Mark) series (Exxon, Houston, Tex.), Norpar (Registered Trade Mark) (a series of normal paraffinic liquids), Shell-Sol (Registered Trade Mark) (Shell, Houston, Tex.), and Sol-Trol (Registered Trade Mark) (Shell), naphtha, and other petroleum solvents. These materials usually have low densities. Useful examples of silicone oils include, but are not limited to, octamethyl cyclosiloxane and higher molecular weight cyclic siloxanes, poly(methyl phenyl siloxane), hexamethyldisiloxane, and polydimethylsiloxane. These materials usually have low densities. Useful low molecular weight halogen-containing polymers include, but are not limited to, poly(chlorotrifluoroethylene) polymer (Halogenated Hydrocarbon Inc., River Edge, N.J.), Galden (Registered Trade Mark) (a perfluorinated ether from Ausimont, Morristown, N.J.), or Krytox (Registered Trade Mark) from du Pont (Wilmington, Del.). In a preferred embodiment, the suspending fluid is a poly (chlorotrifluoroethylene) polymer. In a particularly preferred embodiment, this polymer has a degree of polymerization from about 2 to about 10. Many of the above materials are available in a range of viscosities, densities, and boiling points.

The non-polar fluid must be capable of being formed into small droplets prior to a capsule being formed. Processes for forming small droplets include flow-through jets, membranes, nozzles, or orifices, as well as shear-based emulsifying schemes. The formation of small drops may be assisted by electrical or sonic fields. Surfactants and polymers can be used to aid in the stabilization and emulsification of the droplets in the case of an emulsion type encapsulation. One surfactant for use in displays of the invention is sodium dodecylsulfate.

It some embodiments, the non-polar fluid will include an optically absorbing dye. This dye must be soluble in the fluid, but will generally be insoluble in the other components of the capsule. There is much flexibility in the choice of dye material. The dye can be a pure compound, or blends of dyes to achieve a particular color, including black. The dyes can be fluorescent, which would produce a display in which the fluorescence properties depend on the position of the particles. The dyes can be photoactive, changing to another color or becoming colorless upon irradiation with either visible or ultraviolet light, providing another means for obtaining an optical response. Dyes could also be polymerizable by, for example, thermal, photochemical or chemical diffusion processes, forming a solid absorbing polymer inside the bounding shell.

There are many dyes that can be used in encapsulated electrophoretic displays. Properties important here include light fastness, solubility in the suspending liquid, color, and cost. These dyes are generally chosen from the classes of azo, anthraquinone, and triphenylmethane type dyes and may be chemically modified so as to increase their solubility in the oil phase and reduce their adsorption by the particle surface.

A number of dyes already known to those skilled in the art of electrophoretic displays will prove useful. Useful azo dyes include, but are not limited to: the Oil Red dyes, and the Sudan Red and Sudan Black series of dyes. Useful anthraquinone dyes include, but are not limited to: the Oil Blue dyes, and the Macrolex Blue series of dyes. Useful triphenylmethane dyes include, but are not limited to, Michler's hydrol, Malachite Green, Crystal Violet, and Auramine O.

In general, it is believed that charging results as an acid-base reaction between some moiety present in the continuous phase and the particle surface. Thus useful materials are those which are capable of participating in such a reaction, or any other charging reaction as known in the art.

Particle dispersion stabilizers may be added to prevent particle flocculation or attachment to the capsule walls. For the typical high resistivity liquids used as suspending fluids in electrophoretic displays, non-aqueous surfactants may be used. These include, but are not limited to, glycol ethers, acetylenic glycols, alkanolamides, sorbitol derivatives, alkyl amines, quaternary amines, imidazolines, dialkyl oxides, and sulfosuccinates.

If a bistable electrophoretic medium is desired, it may be desirable to include in the suspending fluid a polymer having a number average molecular weight in excess of about 20,000, this polymer being essentially non-absorbing on the electrophoretic particles; poly(isobutylene) is a preferred polymer for this purpose. See application Ser. No. 10/063, 236 filed Apr. 2, 2002 (Publication No. 2002/0180687; the entire disclosure of this copending application is herein incorporated by reference), and the corresponding International Application No. PCT/US02/10267 (Publication No. WO 02/079869).

Encapsulating Electrophoretic Media

Encapsulation of the internal phase may be accomplished in a number of different ways. Numerous suitable procedures for microencapsulation are detailed in both Microencapsulation, Processes and Applications, (I. E. Vandegaer, ed.), Plenum Press, New York, N.Y. (1974) and Gutcho, Microcapsules and Microencapsulation Techniques, Noyes Data Corp., Park Ridge, N.J. (1976). The processes fall into several general categories, all of which can be applied to the present invention: interfacial polymerization, in situ polymerization, physical processes, such as coextrusion and other phase separation processes, in-liquid curing, and simple/complex coacervation.

Numerous materials and processes should prove useful in formulating displays of the present invention. Useful materials for simple coacervation processes to form the capsule include, but are not limited to, gelatin, poly(vinyl alcohol), poly(vinyl acetate), and cellulosic derivatives, such as, for example, carboxymethylcellulose. Useful materials for complex coacervation processes include, but are not limited to, gelatin, acacia, carageenan, carboxymethylcellulose, hydrolyzed styrene anhydride copolymers, agar, alginate, casein, albumin, methyl vinyl ether co-maleic anhydride, and cellulose phthalate. Useful materials for phase separation processes include, but are not limited to, polystyrene, poly(methyl methacrylate) (PMMA), poly(ethyl methacrylate), poly(butyl methacrylate), ethyl cellulose, poly(vinylpyridine), and polyacrylonitrile. Useful materials for in situ polymerization processes include, but are not limited to, polyhydroxyamides, with aldehydes, melamine, or urea and formaldehyde; water-soluble oligomers of the condensate of melamine, or urea and formaldehyde; and vinyl monomers, such as, for example, styrene, methyl methacrylate (MMA) and acrylonitrile. Finally, useful materials for interfacial polymerization processes include, but are not limited to, diacyl chlorides, such as, for example, sebacoyl, adipoyl, and di- or poly-amines or alcohols, and isocyanates. Useful emulsion polymerization materials may include, but are not limited to, styrene, vinyl acetate, acrylic acid, butyl acrylate, t-butyl acrylate, methyl methacrylate, and butyl methacrylate.

Capsules produced may be dispersed into a curable carrier, resulting in an ink which may be printed or coated on large and arbitrarily shaped or curved surfaces using conventional printing and coating techniques.

In the context of the present invention, one skilled in the art will select an encapsulation procedure and wall material based on the desired capsule properties. These properties include the distribution of capsule radii; electrical, mechanical, diffusion, and optical properties of the capsule wall; and chemical compatibility with the internal phase of the capsule.

The capsule wall generally has a high electrical resistivity. Although it is possible to use walls with relatively low resistivities, this may limit performance in requiring relatively higher addressing voltages. The capsule wall should also be mechanically strong (although if the finished capsule powder is to be dispersed in a curable polymeric binder for coating, mechanical strength is not as critical). The capsule wall should generally not be porous. If, however, it is desired to use an encapsulation procedure that produces porous capsules, these can be overcoated in a post-processing step (i.e., a second encapsulation). Moreover, if the capsules are to be dispersed in a curable binder, the binder will serve to close the pores. The capsule walls should be optically clear. The wall material may, however, be chosen to match the refractive index of the internal phase of the capsule (i.e., the suspending fluid) or a binder in which the capsules are to be dispersed. For some applications (e.g., interposition between two fixed electrodes), monodispersed capsule radii are desirable.

An encapsulation technique that is suited to the present invention involves a polymerization between urea and formaldehyde in an aqueous phase of an oil/water emulsion in the presence of a negatively charged, carboxyl-substituted, linear hydrocarbon polyelectrolyte material. The resulting capsule wall is a urea/formaldehyde copolymer, which discretely encloses the internal phase. The capsule is clear, mechanically strong, and has good resistivity properties.

The related technique of in situ polymerization utilizes an oil/water emulsion, which is formed by dispersing the electrophoretic fluid (i.e., the dielectric liquid containing a suspension of the pigment particles) in an aqueous environment. The monomers polymerize to form a polymer with higher affinity for the internal phase than for the aqueous phase, thus condensing around the emulsified oily droplets. In one in situ polymerization process, urea and formaldehyde condense in the presence of poly(acrylic acid) (see, e.g., U.S. Pat. No. 4,001,140). In other processes, described in U.S. Pat. No. 4,273,672, any of a variety of cross-linking agents borne in aqueous solution is deposited around microscopic oil droplets. Such cross-linking agents include aldehydes, especially formaldehyde, glyoxal, or glutaraldehyde; alum; zirconium salts; and polyisocyanates.

The coacervation approach also utilizes an oil/water emulsion. One or more colloids are coacervated (i.e., agglomerated) out of the aqueous phase and deposited as shells around the oily droplets through control of temperature, pH and/or relative concentrations, thereby creating the microcapsule. Materials suitable for coacervation include gelatins and gum arabic. See, e.g., U.S. Pat. No. 2,800,457.

The interfacial polymerization approach relies on the presence of an oil-soluble monomer in the electrophoretic composition, which once again is present as an emulsion in an aqueous phase. The monomers in the minute hydrophobic droplets react with a monomer introduced into the aqueous phase, polymerizing at the interface between the droplets and the surrounding aqueous medium and forming shells around the droplets. Although the resulting walls are relatively thin and may be permeable, this process does not require the elevated temperatures characteristic of some other processes, and therefore affords greater flexibility in terms of choosing the dielectric liquid.

Additional materials may be added to encapsulated medium to improve the construction of an electrophoretic display. For example, coating aids can be used to improve the uniformity and quality of the coated or printed electrophoretic ink material. Wetting agents may be added to adjust the interfacial tension at the coating/substrate interface and to adjust the liquid/air surface tension. Wetting agents include, but are not limited to, anionic and cationic surfactants, and nonionic species, such as silicone or fluoropolymer-based materials. Dispersing agents may be used to modify the interfacial tension between the capsules and binder, providing control over flocculation and particle settling.

In other embodiments, the electrophoretic medium may be contained in microfabricated cells, i.e., microcells, such as fabricated by E Ink under the tradename MICROCUP. Once the microcells are filled with the electrophoretic medium, the microcells are sealed, an electrode (or an electrode array) is affixed to the microcells, and the filled microcells are driven with electric fields to create a display.

For example, as described in U.S. Pat. No. 6,930,818, a male mold may be used to imprint a conductive substrate, upon which is formed a transparent conductor film. A layer of a thermoplastic or thermoset precursor is then coated on the conductor film. The thermoplastic or thermoset precursor layer is embossed at a temperature higher than the glass transition temperature of the thermoplastic or thermoset precursor layer by the male mold in the form of a roller, plate or belt. Once formed, the mold is released during or after the precursor layer is hardened to reveal an array of microcells. The hardening of the precursor layer may be accomplished by cooling, cross-linking by radiation, heat or moisture. If the curing of the thermoset precursor is accomplished by UV radiation, UV may radiate onto the transparent conductor film from the bottom or the top of the web as shown in the two figures. Alternatively, UV lamps may be placed inside the mold. In this case, the mold must be transparent to allow the UV light to radiate through the pre-patterned male mold on to the thermoset precursor layer.

The thermoplastic or thermoset precursor for the preparation of the microcells may be multifunctional acrylate or methacrylate, vinylether, epoxide and their oligomers, polymers and the like. A crosslinkable oligomer imparting flexibility, such as urethane acrylate or polyester acrylate, is usually also added to improve the flexure resistance of the embossed micro-cups. The composition may contain polymer, oligomer, monomer and additives or only oligomer, monomer and additives.

In general, the microcells can be of any shape, and their sizes and shapes may vary. The microcells may be of substantially uniform size and shape in one system. However, in order to maximize the optical effect, microcells having a mixture of different shapes and sizes may be produced. For example, microcells filled with a dispersion of the red color may have a different shape or size from the green microcells or the blue microcells. Furthermore, a pixel may consist of different numbers of microcells of different colors. For example, a pixel may consist of a number of small green microcells, a number of large red microcells, and a number of small blue microcells. It is not necessary to have the same shape and number for the three colors.

The openings of the microcells may be round, square, rectangular, hexagonal, or any other shape. The partition area between the openings is preferably kept small in order to achieve a high color saturation and contrast while maintaining desirable mechanical properties. Consequently the honeycomb-shaped opening is preferred over, for example, the circular opening.

For reflective electrophoretic displays, the dimension of each individual microcell may be in the range of about $10^2$ to about $5 \times 10^5$ $\mu m^2$, preferably from about $10^3$ about $5 \times 10^4$ $\mu m^2$. The depth of the microcells is in the range of about 3 to about 100 microns, preferably from about 10 to about 50 microns. The opening to wall ratio is in the range of from about 0.05 to about 100, preferably from about 0.4 to about 20. The distances of the openings usually are in the range of from about 15 to about 450 microns, preferably from about 25 to about 300 microns from edge to edge of the openings.

Taken together, it will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

EXAMPLES

Examples are now given, though by way of illustration only, to show details of preferred electrophoretic media of the present invention and processes for driving these preferred electrophoretic media. The particles used in these Examples are as follows:

White pigment (WP) is a silanol-functionalized light-scattering pigment (titanium dioxide) to which a polymeric material comprising lauryl methacrylate (LMA) monomers has been attached as described in U.S. Pat. No. 7,002,728. It is understood that other white (or colored) pigments can be used with the invention.

Black pigment (BP) is a copper chromite-based inorganic pigment that has been surface functionalized using N-[3-(trimethoxysilyl)propyl]-N'-(4-vinylbenzyl)ethylenediamine bishydrochloride (United Chemical Technologies) using substantially the same procedure as described in U.S. Pat. No. 6,822,782 (Example 26). It is understood that other black (or colored) pigments can be used with the invention.

Example 1—Internal Phase Preparation 100 g of internal phase is prepared by combining the following constituents in a plastic bottle with mixing:

TABLE 1

| Components of exemplary electrophoretic media | | | | | |
|---|---|---|---|---|---|
| Component | S16k Formulation | S19k Formulation | S17k Form. #1 | S17k Form. #2 | S17k Form. #3 |
| 60% Black Pigment in ISOPAR (Exxon) | 20.83 g | 20.83 g | 20.83 g | 20.83 g | 20.83 g |
| 60% White Pigment in ISOPAR | 62.5 g | 62.5 g | 62.5 g | 62.5 g | 62.5 g |

TABLE 1-continued

Components of exemplary electrophoretic media

| Component | S16k Formulation | S19k Formulation | S17k Form. #1 | S17k Form. #2 | S17k Form. #3 |
|---|---|---|---|---|---|
| 10 wt % polyisobutylene in ISOPAR | 5.25 g | 5.25 g | 5.25 g | 5.50 g | 5.75 g |
| 20% Charge Control Agent in ISOPAR | 4.50 g | 3.00 g | 7.00 g | 7.00 g | 7.00 g |
| Additional ISOPAR | 6.92 g | 8.42 g | 4.42 g | 4.17 | 3.92 |

The formulations S16k and S19k correspond to commercial formulations of charge control agents having unsaturated polymeric tails (SOLSPERSE 16000 and SOLSPERSE 19000; Lubrizol Corporation, Wickliffe, OH). The S17k formulations 1-3 correspond to commercial formulations of charge control agents having saturated polymeric tails (SOLSPERSE 17000; Lubrizol). All of the charge control agents comprise a quaternary amine headgroup that complexes with the surface of the pigment. In some embodiments the quaternary amine headgroup is adsorbed to the surface of the pigment, in some embodiments the quaternary amine headgroup is covalently bonded to the surface of the pigment, in some embodiments the quaternary amine headgroup is associated with the pigment due to opposing charges. The formulations in Table 1 may include additional charge stabilization agents, such as sulfates, bisulfates, phosphates, nitrites, and/or nitrates.

Example 2—Conductivity and Rheology of Internal Phase Formulations

S17k formulation #1, the S16k formulation, and the S19k formulation were tested for viscosity and conductivity. The viscosity was measured on an Ares G2 Rheometer (TA Instruments, New Castle, DE) using recessed concentric cylinders in a forced convection oven cooled with evaporating liquid nitrogen. The data in FIG. 1 corresponds to a temperature ramp of 2° C./min. As seen in FIG. 1, the viscosity of the formulations was quite similar for the range of –20° C. to 25° C. However, below about –20° C. there was a pronounced increase in the viscosity of the S17k #1 formulation, as opposed to the S19k formulation, which includes an unsaturated tail group. The S16k formulation, which includes an unsaturated tail group of a different weight than the S19k formulations also did not show a marked increase in viscosity around –20° C. (data not shown in FIG. 1).

Figure 2:
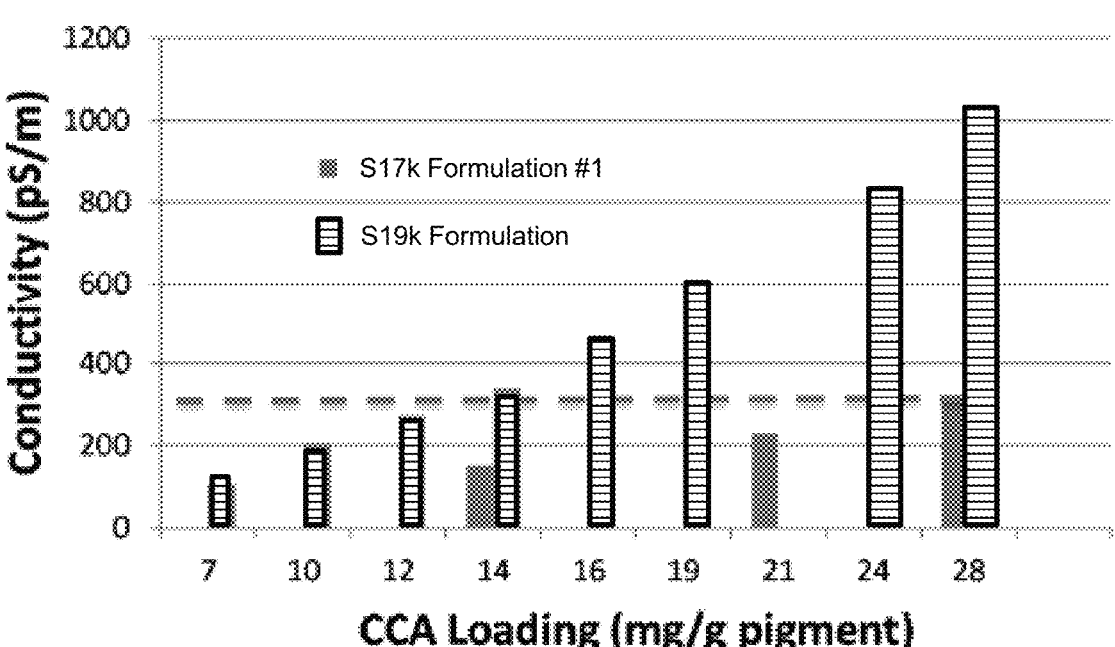
FIG. 2 shows that the conductivity of an electrophoretic medium varies significantly with the inclusion of a charge control agent having an unsaturated tail group.

The physiochemical performance of the formulations did not appear to be solely due to the interaction between the saturated (or unsaturated) tail groups and the non-polar fluid of the electrophoretic medium (ISOPAR E; ExxonMobil Chemicals, Spring, TX). Rather, the performance of the medium appears to be a complex interaction between the non-polar fluid, the charged particles, and the charge control agents. As shown in FIG. 2, formulations including SOLSPERSE 19k (unsaturated tail) had much higher conductivity than formulations including SOLSPERSE 17k (saturated tail) at similar loading levels. A similar trend was also seen with SOLSPERSE 16k (unsaturated tail) (data not shown in FIG. 2). The marked differences in conductivity between the saturated and unsaturated charge control agents were unexpected because the dominant charge carriers in the electrophoretic medium are the charged pigments, which are loaded at identical levels in all formulations. The observed trends in conductivity may be related to the observed changes in viscosity (FIG. 1) because the increased mobility of the pigments may facilitate alignment of the charged particles with instantaneous electric fields associated with the conductivity measurements. Regardless of the underlying physical reasons, the differences in conductivity between the electrophoretic medium will influence the stability of a resulting electrophoretic display. Accordingly, the actual loading of unsaturated charge control agent was reduced (as compared to the loading of saturated charge control agents) for the analyses described below. The decreased loading is reflected in Table 1, where the unsaturated CCAs are loaded at about half of the amount of the saturated CCAs.

Example 3—Encapsulation of Internal Phase

The internal phases, described in Table 1, were encapsulated in a gelatin/acacia coacervate using techniques similar to those described in U.S. Pat. No. 7,170,670. DI water (161.5 g) was added to a 500 mL jacketed reactor held at 25° C. using a circulating, controlled-temperature bath. Powdered, acid-processed pig-skin gelatin (10.66 g) was hydrated by sprinkling the powdered material onto the surface of the water in the reactor and the suspension was allowed to stand for 0.5 hr. The solution stirred for 1 hr at 100 rpm. During this hour, the temperature was gradually increased from 25° C. to 42.5° C. using a programmable water bath (Huber Ministat 230 with programmable controller). The stirring rate was subsequently increased to 300 rpm. At the higher rotational speed, 162.73 g of the internal phase (Example 1) was added to the gelatin solution with a sub-surface addition funnel. The addition was over a period of about one minute. Immediately after addition, the stir rate was increased to 535 rpm, and the solution was stirred for 25 min. The capsule size distribution (CSD) was then measured, and the stir rate adjusted to achieve a distribution of 20-70 μm, as desired.

Once the desired CSD was achieved, 377.8 g of 42.5° C. water was added, and the stirring rate was adjusted to 675 rpm and 13.7 g of solids of acacia was added. The complete suspension, including gelatin, internal phase, and acacia was stirred for 90 min at 675 rpm. Upon completion of stirring, 1.735 g of 10% acetic acid was added to the reactor. Over the next 14 hours, the programmable water bath gradually raised the temperature of the mixture to 51° C. and then cooled it to 10° C. Once the suspension reached 10° C., 4.86 g of 50% glutaraldehyde solution in water was added with stirring, completing the encapsulation of the internal phase. The resulting encapsulated material was isolated by sedimentation, washed with DI water, and classified by sieving, using sieves of varying mesh size. A distribution analysis (Coulter Multisizer) showed that the resulting capsules had a distribution of 30 to 50 μm with a mean size of ~40 μm.

Example 4—Laminating Encapsulated Medium for Test Panels

The encapsulated electrophoretic medium was transformed into a slurry for lamination as described in U.S. Pat. No. 8,199,395. The pH was raised above 8.0 with the addition of a 1% ammonium hydroxide solution. The capsule slurry was then mixed with a polyurethane binder at a ratio of 1 part by weight binder to 8 parts by weight of capsules. Next a 1% hydroxypropylmethylcellulose (HPMC) in water solution was added as a thickener, with a desired weight fraction of 0.002 HPMC in the slurry. Triton X-100 (Sigma-Aldrich) was added as a surfactant, with a desired weight fraction of 0.001. The resultant slurry was stirred for one hour.

Figure 3:
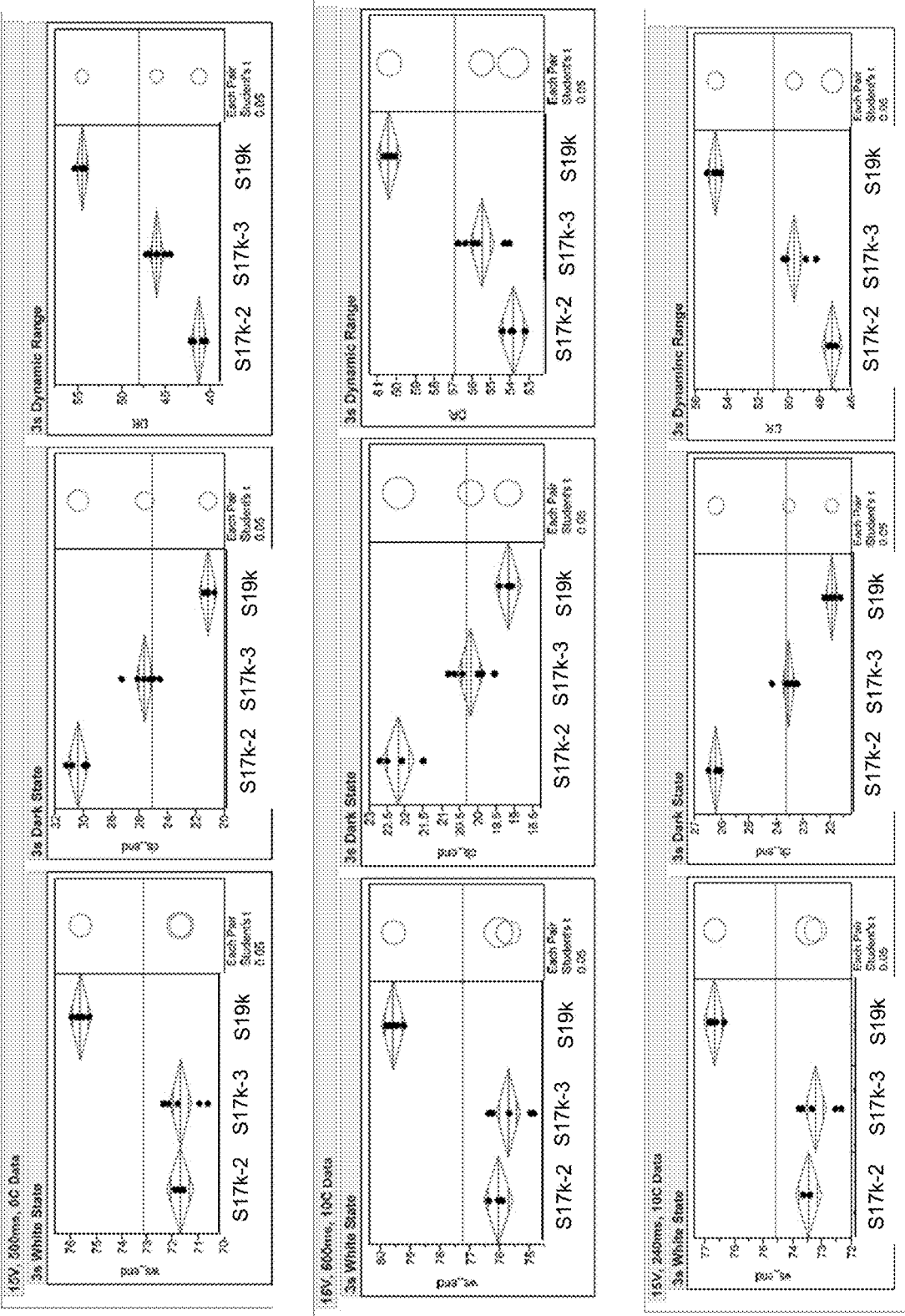
FIG. 3 illustrates improved performance of electrophoretic media including charge control agents having an unsaturated tail group. The improved performance is most notable at lower temperatures (~0° C.) and under fast-switching conditions (<250 ms/pulse)
Figure 4:
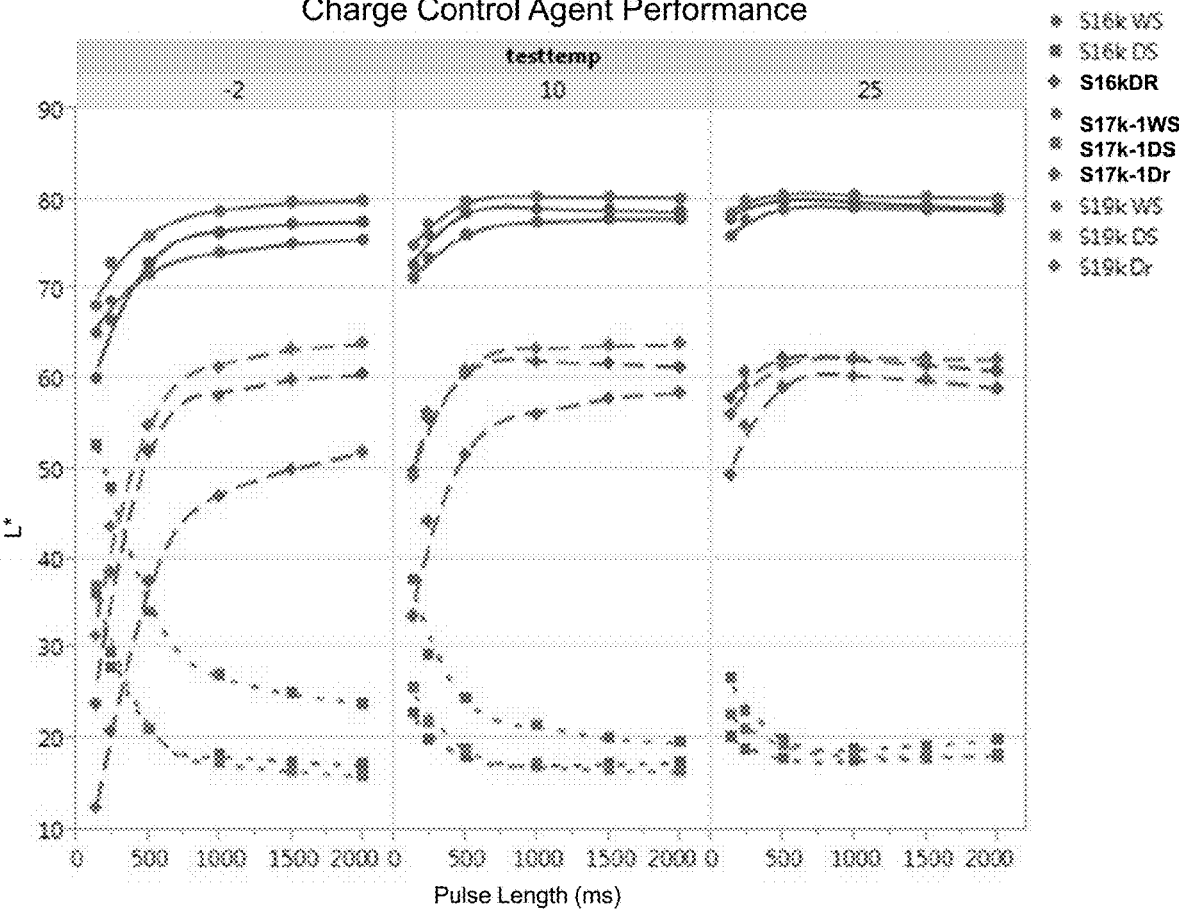
FIG. 4 is a compilation of performance data for various electrophoretic media including unsaturated (S16k, S19k) and saturated (S17k) charge control agents.

The basic slurry was then bar-coated on to a 127 µm-thick polyester film coated with indium tin oxide (ITO), which will act as an electrode. The coated film was oven dried at 60° C. for 15 minutes to produce an electrophoretic medium approximately 30 µm thick containing essentially a single layer of capsules on ITO. From the resulting film, a front-plane laminate (see U.S. Pat. No. 6,982,178) was produced by laminating a doped polyurethane adhesive over the capsule layer. The front plane laminate was then laminated to a segmented graphite backplane comprising a layer of graphite on a polyester film to produce experimental electro-optic displays suitable for measurement of their electro-optical properties, i.e., as shown in FIGS. 3 and 4. The finished electro-optic displays were equilibrated for five days at a temperature of 25° C. and a relative humidity of 50%.

Example 5—Optical State Measurements

The electro-optical properties of the displays described in Example 3 were measured using a PR-650 SpectraScan Colorimeter. The samples were driven at various voltages, pulse lengths and temperatures. In these tests, the displays were repeatedly driven to their black and white extreme optical states, then driven to either their black or white extreme optical state. The reflectivity of the optical state was measured about 3 seconds after the final drive pulse (to allow certain transient effects to pass) and then 2 minutes after the final drive pulse, and the two measurements compared to detect any image instability (i.e., lack of bistability in the image). The results are shown in FIG. 3 (in which "DS" refers to dark state and "WS" to white state). The data in FIG. 3 correspond to S17k formulations 2 and 3, which are commercial formulations. The performance of S16k and S19k formulations were similar, however the S19k formulation was generally superior to S16k.

Viewing FIG. 3, it is clear that electrophoretic media including unsaturated charge control agents provide display performance better than electrophoretic media with saturated charge control agents. In particular, the S19k formulation showed brighter white states, darker dark states, and, thus, a wider dynamic range over a range of temperatures. Additionally, the switching speeds, from a white threshold to a black threshold, were faster with formulations including an unsaturated CCA. The increased switching speed was especially evident at low temperatures, e.g., at around 0° C. Overall, a 55L* dynamic range could be achieved at 0° C. with a 15V, 500 ms drive pulse. At 10° C., a 55L* dynamic range could be achieved with a 15V, 240 ms drive pulse, while a 60L* dynamic range could be achieved with a 15V, 500 ms drive pulse.

Additional evidence of the improved performance of electrophoretic media including unsaturated charge control agents is shown in FIG. 4. FIG. 4 shows the electro-optic performance of the S16k, S17k #1, and S19k internal phases at −2° C., 10° C., and 25° C. across several different pulse lengths. These internal phases were encapsulated at the 500 mL scale. As can be seen in FIG. 4 there is a significant difference in dark state performance (filled squares) across all pulse lengths at −2° C. between the unsaturated CCAs (S16k, S19k) and the saturated CCA (S17k). Additionally, at −2° C. the white state performance (filled circles) of the unsaturated CCA formulations is measurably better at longer pulse lengths than the saturated CCA formulations, and about the same at shorted pulse lengths. The differences between the unsaturated and saturated CCA formulations are less pronounced at 10° C., and almost disappear at 25° C.

Example 6—Optical State Measurements in Microcells

Separate microcell arrays of the type described in U.S. Pat. No. 7,492,505 were prepared, filled with S19k and S17k (formulation #1) electrophoretic media (described in Example 1), and sealed. The arrays were evaluated for optical performance as described above in Example 5. The tests were performed at 20° C. When driving the microcell displays at 15V for 5 seconds, it was found that the microcell display including the S19k electrophoretic medium had a white state that was about 15% whiter (higher L* value) than the microcell display incorporating the S17k medium. At the same time, the microcell display with the S19k medium exhibited a dark state that was about 15% darker (lower L*) than the S17k formulation. Accordingly, the dynamic range of the microcell displays including the S19k also improved by approximately 15% as compared to the microcell displays including the S17k formulation. This data suggests that the improved performance of the electrophortetic media with the incorporation of unsaturated charge control agents should not be strongly dependent upon the type of encapsulation used.

The incorporation of unsaturated CCAs in the electrophoretic media described herein will result in a meaningful improvement in the low temperature performance of electrophoretic displays incorporating these media. Such electrophoretic displays will update faster and will have better contrast when used in outdoor applications in temperate climates. Accordingly, formulations including unsaturated CCAs will be well-suited for use in digital signage and e-readers in temperate climates. Such formulations will also be well suited for use in displays that are incorporated into devices that are designed to operate at low temperatures (e.g., refrigerated containers) or at a wide range of temperatures (e.g., automobiles).

The invention claimed is:

1. An electrophoretic medium comprising:
    (a) a non-polar fluid;
    (b) a plurality of first charged particles having a first charge polarity;
    (c) a plurality of second charged particles having a second charge polarity; and
    (d) a charge control agent comprising a quaternary amine and an unsaturated polymeric tail having at least one carbon-carbon double bond comprising monomers of at least 10 carbon atoms in length, wherein the polymeric tail comprises a polyester, and wherein the charge control agent is adsorbed on the first and second charged particle;

wherein the conductivity of the electrophoretic medium is higher than 300 pS/m, when the content of the charge control agent in mg per gram of pigment is 15 or higher; and wherein the viscosity of the electrophoretic medium is less than $5 \times 10^{-2}$ Pa·s at $-30°$ C., measured with a rheometer having a recessed concentric cylinder using a temperature ramp of 2° C. per minute method.

2. The electrophoretic medium of claim 1, wherein the first and second charged particles have different colors.

3. The electrophoretic medium of claim 1, wherein the polymeric tail comprises monomers of at least 14 carbon atoms in length.

4. The electrophoretic medium of claim 1, wherein the ratio of the charge control agent to the first charged particles is greater than 1:300 wt/wt.

5. The electrophoretic medium of claim 1, wherein the first charged particles comprise titania, carbon black, or copper chromite.

6. The electrophoretic medium of claim 1, further comprising a plurality of third charged particles.

7. The electrophoretic medium of claim 6, wherein the first, second, or third charged particles are (i) black, white, and red, or (ii) black, white, and yellow, or (iii) red, green, and blue, or (iv) cyan, magenta, and yellow, or (v) red, green, and yellow.

8. The electrophoretic medium of claim 6, wherein the third charge particles have a charge level less than 50% of the charge level of the first and second charge particles.

9. The electrophoretic medium of claim 6, further comprising a plurality of fourth charged particles.

10. The electrophoretic medium of claim 1, wherein the conductivity of the electrophoretic medium is less than 300 pS/m.

11. The electrophoretic medium of claim 10, wherein the first charged particles will move through the non-polar fluid at a speed of greater than 50 μm/s in a field of 300 kV/m when the electrophoretic medium is at a temperature of 0° C.

12. The electrophoretic medium of claim 1, further comprising a charge adjuvant, wherein the charge adjuvant is present in an amount of 1 to 100 mg per gram of particle mass, wherein the charge adjuvant is a polyhydroxy compound or an aminoalcohol.

13. An electronic book reader, portable computer, tablet computer, cellular telephone, smart card, sign, watch, shelf label, flash drive, a window, or a window film comprising an electrophoretic medium of claim 1.

* * * * *